United States Patent

[11] 3,548,779

[72] Inventor Edmund T. Green
 87 W. Oak St., Farmingdale, N.Y. 11735
[21] Appl. No. 833,944
[22] Filed June 17, 1969
[45] Patented Dec. 22, 1970

[54] LIQUID LEVEL SIGNAL FOR TANKS
 5 Claims, 3 Drawing Figs.
[52] U.S. Cl. ..................................... 116/109,
 141/95
[51] Int. Cl. ..................................... G01f 23/00
[50] Field of Search ............................... 116/109,
 112; 73/307, 291, 294; 141/95; 222/40

[56] References Cited
UNITED STATES PATENTS
2,140,559 12/1938 Scully et al. .................. 116/109
2,548,734 4/1951 Mathey ......................... 116/109X
2,690,155 9/1954 Cary, Jr. ....................... 141/95X
2,935,099 5/1960 Haynes......................... 141/95
2,972,362 2/1961 Gardner....................... 116/109X
3,136,295 6/1964 Gramu ......................... 73/294X Primary Examiner—Louis R. Prince
Assistant Examiner—Daniel M. Yasich
Attorney—Allison C. Collard ABSTRACT: A liquid level signalling device for use with submerged or buried fuel tanks, which is coupled to the fill line of the tank below the ground level, and includes a slidably disposed alarm tube which may be raised above the ground level while the tank is being filled to permit the audible alarm to be heard in all directions. The alarm tube may then be pushed below the ground level after the delivery has been completed so that no portion of the liquid level signalling device remains disposed above the ground.

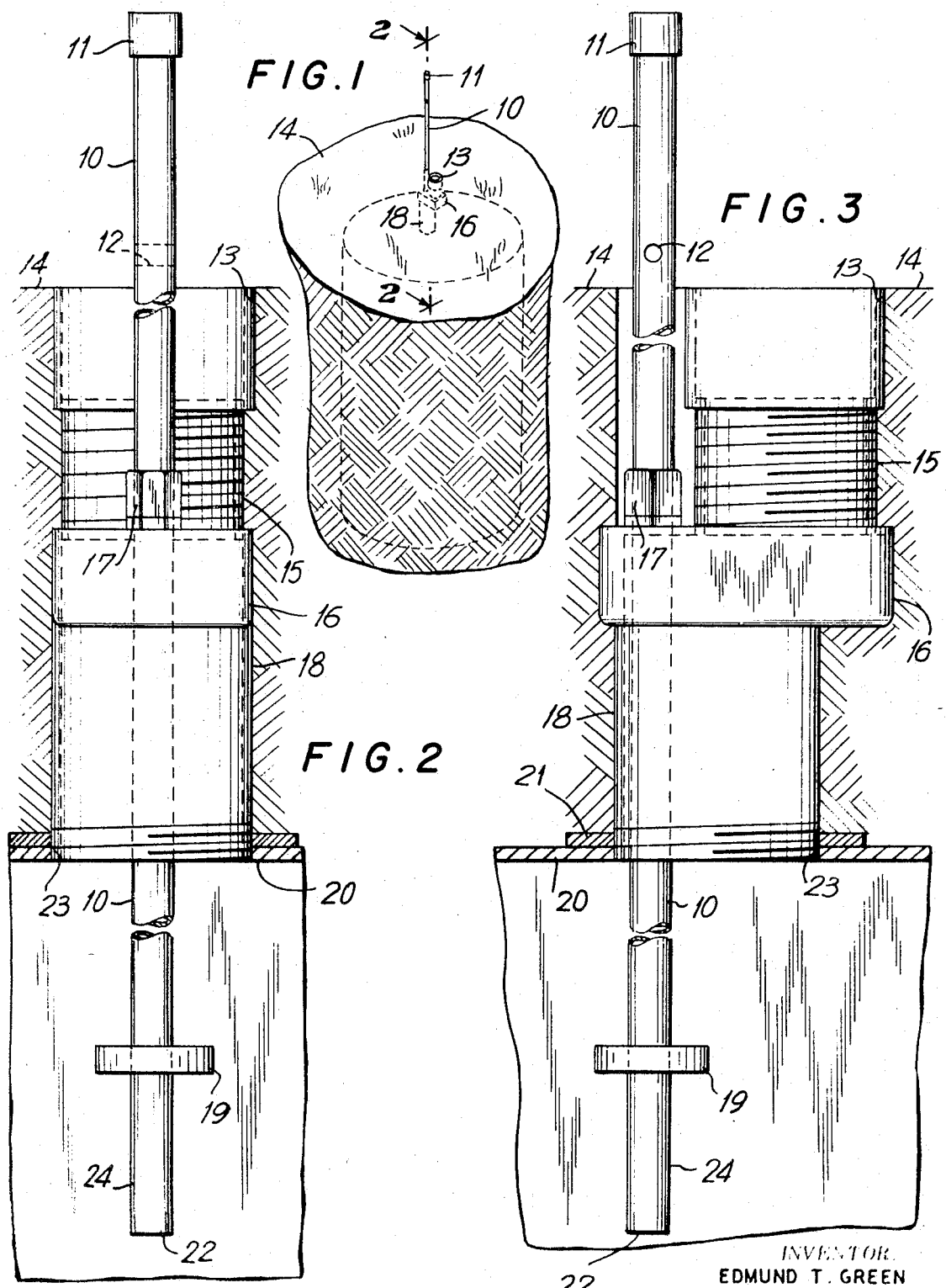

LIQUID SIGNAL FOR TANKS

This invention relates to signalling devices used in filling liquid storage tanks.

More specifically, this invention relates to signalling devices for use with fill pipes which are connected to tanks adapted to have liquid pumped through the fill pipe, so that an audible signal will indicate the rise of the liquid level to a predetermined height in the tank.

Conventional liquid level signalling devices are generally utilized in domestic fuel tanks for residences wherein the tank and fill pipes are readily accessible for modifying the tanks to include the alarm device. In tanks which are submerged or buried underground, it is not always convenient to dig up the tank in order to insert fill alarm devices. In order to add alarm devices to submerged or buried tanks, it has been known to include a temporary attachment which connects to the fill line of the submerged tank, which will give off an audible alarm as the tank is being filled. These attachments however have been found to be unreliable and often become misplaced or lost when they are needed during the filling of the tank.

Accordingly, the present invention provides a liquid level alarm device for use with submerged or buried tanks which can be easily connected to the fill pipe of the tank just below the ground level. When the tank is being filled, the alarm device may be raised above the ground level so that it is audible in all directions in order to detect the level of the liquid or fuel in the tank. The bottom portion of the alarm extends a short distance into the top of the tank when it is fully raised for use, so that when the level of the liquid covers over the bottom of the alarm tube, the alarm will cease to operate and indicate that the liquid level has almost reached the top of the tank. This will indicate to delivery personnel that no further liquid should be added to the tank so that the input lines may be disconnected from the fill line and the alarm pushed down into the tank so that its top portion comes to rest below the ground level. No portion of the fill alarm device remains above the ground level after it has been used.

It is therefore an object according to the present invention to provide a liquid level alarm device which is capable of detecting the level of the liquid in a submerged or buried tank.

It is another object according to the present invention to provide a liquid level signalling device, which, when connected to the fill line of a submerged or buried tank, can be raised in place for operation above the ground level so as to produce an audible alarm in all directions.

It is a further object according to the present invention to provide a liquid level signalling device which is simple in design, easy to manufacture, and reliable in operation.

Other objects and features of the present invention will become apparent from the following detailed description considered in connection with the accompanying drawing which discloses one embodiment of the present invention. It is to be understood, however, that the drawing is designed for the purpose of illustration only, and not as a definition of the limits of the invention.

In the drawing, wherein similar reference characters denote similar elements throughout the several views:

FIG. 1 is a perspective view, partly in cross section, of the liquid level signalling device according to the invention, raised in height for operation;

FIG. 2 is a cross-sectional view taken along section 2-2 of FIG. 1; and,

FIG. 3 is an additional side view, partly in cross section, of the embodiments of FIGS. 1 and 2.

Referring to the drawings, there is shown a submerged or buried fuel tank 20 having a threaded opening 23 on a portion of its top which is surrounded by flange 21 for receiving a correspondingly threaded fill pipe 18. Connected to the top portion of fill pipe 18 is an expanded adapter 16, for receiving an extension of the fill pipe consisting of a threaded pipe 15 and coupling 13 connected to pipe 15. On one side of adapter 16 is slidably disposed an alarm tube 10 consisting of a hollow tube which extends through fill pipe 18 into the top of tank 20. The top portion of alarm tube 10 is sealed off by means of cap 11, and includes a whistle hole 12 which is communicative to the internal chamber of tube 10. Tube 10 is slidably disposed through a captive nut 17 which is retained on the top surface of adapter 16. Captive nut 17 can be tightened to prevent tube 10 from sliding within adapter 16 so as to maintain tube 10, whistle opening 12 above ground level 14 when the tank is being filled. Secured adjacent to the bottom of tube 10 is a stop 19 which prevents tube 10 from being raised above a certain level. Below stop 19 is an extension 24 of tube 10, integrally formed therewith, and of a predetermined length so that extension 24 remains disposed within tank 20 at all times.

When a liquid, such as fuel oil, is pumped into the tank through coupling 13 and fill pipe 18, a portion of the air exiting from the tank enters into opening 22 of tube 10 and creates a loud audible whistling noise as it emerges from opening 12. When the level of the fuel covers over opening 22, no further air will emerge from hole 12 so that the audible whistle will cease. Tube extension 24 is of sufficient length to give the delivery personnel enough time to shut down the flow of fuel oil before the tank contents overflow. After the delivery has been completed, captive nut 17 is unloosened, and tube 10 is pushed downward so that its cap portion 11 will come to rest below the level of ground 14. The contact of fuel oil against the walls of tube 10 also serve to lubricate its passage through captive nut 17. This makes the signalling device of the invention very reliable and simple in operation.

While only a single embodiment of the invention has been shown and described, it will be understood that many changes and modifications may be made thereunto without departing from the spirit and scope of the invention.

I claim:

1. A liquid level signalling device for coupling to the fill pipe of a storage tank comprising:

adapter means having its bottom portion connected to the top of the fill pipe, said adapter means having an offset opening communicative to the opening of the fill pipe;

a second fill pipe connected to the offset opening of said adapter means; and alarm tube means having a hollow tube slidably disposed through the said adapter means into the fill pipe, said tube means including an opening disposed adjacent to its top portion for permitting the exit gases of the tube to escape and produce an audible signal.

2. The device as recited in claim 1 wherein said alarm tube means additionally comprises a cap secured to its top portion for closing off said portion.

3. The device as recited in claim 1 wherein said alarm tube means additionally comprises a stop secured adjacent to the bottom of the tube for preventing its withdrawal from the tank.

4. The device as recited in claim 3 wherein said alarm tube means additionally comprises lock means for demountably securing said tube means to said adapter means.

5. The alarm device as recited in claim 4 wherein said lock means comprises a captive nut having said alarm tube means disposed through its axis for locking against the walls of the tube.